United States Patent [19]
Spurrier et al.

[11] Patent Number: 5,423,592
[45] Date of Patent: Jun. 13, 1995

[54] COMBINATION FOLDING LOUNGE CHAIR AND WAGON

[76] Inventors: David S. Spurrier, 813 Alexander St., Statesville, N.C. 28677; Daniel R. Spurrier, 4346 Deerwood La., Evans, Ga. 30809

[21] Appl. No.: 100,044

[22] Filed: Jul. 30, 1993

[51] Int. Cl.[6] ........................ A47C 1/024; A47C 4/32
[52] U.S. Cl. ........................... 297/129; 297/19; 297/354.12; 297/354.13; 297/440.24; 297/375
[58] Field of Search ............... 297/19, 27, 28, 118, 297/129, 354.12, 354.13, 375, 380, 360, 440.24

[56] References Cited

U.S. PATENT DOCUMENTS

| | | |
|---|---|---|
| 1,856,113 | 5/1932 | Rapprich . |
| 2,200,647 | 5/1940 | Vanderploeg . |
| 2,681,099 | 6/1954 | Vallone ........................ 297/360 X |
| 2,948,905 | 8/1960 | Sevcik . |
| 2,964,222 | 12/1960 | Rainwater . |
| 3,073,614 | 1/1963 | Zinneman . |
| 3,677,601 | 7/1972 | Morrison et al. . |
| 3,719,389 | 3/1973 | Burton et al. . |
| 3,873,154 | 3/1975 | Baker, Jr. . |
| 3,967,330 | 7/1976 | Zawadowsky . |
| 4,092,032 | 5/1978 | Pittas . |
| 4,119,286 | 10/1978 | Barril . |
| 4,252,371 | 2/1981 | Lehnen ........................ 297/27 X |
| 4,376,547 | 3/1983 | Dominko ........................ 297/118 X |
| 4,469,377 | 9/1984 | O'Rourke . |
| 4,659,142 | 4/1987 | Kuchinsky, Jr. ............... 297/129 X |
| 4,715,650 | 12/1987 | Berman et al. ................. 297/28 |
| 4,733,905 | 3/1988 | Buickerood et al. ............ 297/129 |
| 4,838,608 | 6/1989 | Hansen-Smith et al. ......... 297/27 |
| 4,887,866 | 12/1969 | Rusin ........................ 297/360 X |
| 5,160,182 | 11/1992 | Chang ........................ 297/129 |

*Primary Examiner*—Peter R. Brown

[57] ABSTRACT

A convertible lounge chair and combination wagon includes a frame divided into three rectangular sections which are respectively articulated. There are upper, center, and lower sections. Wheels are attached at the joint between upper and center sections. Flexible material may be suspended across the rectangular frames for supporting a user. Frames are constructed from lightweight tubular plastic bars. Upper and lower sections pivot about joints connecting those sections with the center to enable alternate sitting and reclining positions, as well as compact storage. Foldable arms serve as lateral restraints when the device is used as a wagon for transport of the device itself and objects carried thereon to a use location, such as the beach.

22 Claims, 9 Drawing Sheets

COMBINATION FOLDING LOUNGE CHAIR AND WAGON

BACKGROUND OF THE INVENTION

The present invention relates in general to various improved constructions for outdoor furniture and in particular to a wheeled lounge chair convertible to a lightduty wagon.

A wide variety of outdoor furniture exists in the current market, much of it lightweight and easily transportable. Such furniture is, however, typically kaggage which the owner often must carry along with other items to the beach or other outdoor areas. Typically, existing apparatus can not effectively carry items for outdoor recreational use. A piece of furniture which converts to a means for carrying such items would greatly improve the ability of the outdoor enthusiast to get to and enjoy recreational areas.

Various methods and apparatus are known in the art for constructing folding furniture. For example, U.S. Pat. No. 2,948,905 to Sevick discloses a wheeled, articulated roll-away bed. U.S. Pat. No. 1,856,113 to Rapprich discloses a foldable hygienic couch with a tubular frame. U.S. Pat. No. 2,220,647 to Vanderploeq discloses a convertible chaise cot-bed. U.S. Pat. No. 3,073,614 to Zinneman discloses a combination game cart and hunting chair. U.S. Pat. No. 3,967,330 to Zawadowsky discloses a rectangularly sectioned folding bed. Other exemplary U.S. patents include Burton et al., U.S. Pat. No. 3,719,389; Pittas, U.S. Pat. No. 4,092,032; Barril, U.S. Pat. No. 4,119,286; Baker, Jr., U.S. Pat. No. 3,873,154; Morrison et al., U.S. Pat. No. 3,677,601; Rainwater, U.S. Pat. No. 2,964,222; and O'Rourke, U.S. Pat. No. 4,469,377. The disclosures of the above-indicated patents are fully incorporated herein by reference.

SUMMARY OF THE INVENTION

The present invention recognizes and addresses various of the foregoing drawbacks, and others, concerning outdoor furniture. Thus, broadly speaking, one main object of this invention is improved outdoor furniture.

It is another principal object of the present invention to provide a convertible piece of outdoor furniture, capable of use in a sitting or reclining position, and which converts to a light-duty wagon.

It is another object of the present invention to provide a convertible lounge chair and combination wagon which is easily and efficiently transported and stored when not in use.

It is a further object of the present invention to provide a convertible lounge chair and wagon which is lightweight and which accommodates outdoor weather conditions.

Additional objects and advantages of the invention are set forth in, or will be apparent to those of ordinary skill in the art from, the detailed description which follows. Also, it should be further appreciated that modifications and variations to the specifically illustrated and discussed features or materials hereof may be practiced in various embodiments and uses of this invention without departing from the spirit and scope thereof, by virtue of present reference thereto. Such variations may include, but are not limited to, substitution of equivalent means and features or materials for those shown or discussed, and the functional or positional reversal of various parts, features, or the like.

Still further, it is to be understood that different embodiments, as well as different presently preferred embodiments, of this invention may include various combinations or configurations of presently disclosed features or elements, or their equivalents (including combinations or configurations thereof not expressly shown in the figures or stated in the detailed description). One exemplary such embodiment in the present invention relates to a convertible folding lounge chair and combination wagon. Such arrangement may comprise three rectangular sections, a pair of arms, load-bearing wheels, specific load-bearing means, and various flexible support elements.

More preferably, the three rectangular sections comprise respective lower (or leg), center (or seat), and upper (or back sections respectively articulated, or pivotally formed such that the lower section is foldable upwardly or down beneath the center section. The pair of arms are provided for connecting the upper and center sections, with each of the arms attached to a respective side element of the upper section and a corresponding side element of the center section.

The foregoing preferred load-bearing wheels may be attached at the articulated juncture between the upper and center sections. At the same time, the exemplary load-bearing means may be attached at the articulated juncture between the center and the lower sections, for selectively folding up and under the center section. Provision of the flexible support elements connected to and suspended between side elements of the upper, center, and lower sections, permit support of a user on the device.

Another present exemplary embodiment concerns a frame for a convertible folding lounge chair and wagon. Such frame in combination may variously comprise a rectangular center section, a rectangular upper section, a first supporting section, a rectangular lower section, a second supporting section, a third supporting section, and arm means.

The exemplary rectangular center section preferably comprises two center section longitudinal bars fitted at each end thereof to center section transverse bars below the plane of the center section longitudinal bars. The upper of the center section transverse bars forms an axle for wheels supporting an upper end of the center section.

A rectangular upper section such as in the foregoing example may comprise two upper section longitudinal bars fitted at their upper ends to an upper section transverse bar and fitted at their lower ends to a joint extending below the plane of, and between, the upper section longitudinal bars. Such joint may be further connected to the upper center section transverse bar so that the upper section is pivotable about the upper center section transverse bar.

The preferred first supporting section may be pivotably connected to the upper section transverse bar.

The exemplary rectangular lower section may comprise two lower section longitudinal bars fitted at their lower ends to a lower section transverse bar and at their upper ends to the lower end section transverse bar such that the plane of such lower section longitudinal bars is above, and such lower section pivots around, such transverse bar of the lower center section.

The exemplary second supporting section may pivotably connect to the lower end transverse bar of the center section, while the third supporting section may be pivotably connected to the lower end transverse bar of the lower section.

Lastly, the foregoing exemplary arm means may be provided for selectively interconnecting the center and upper sections in predetermined positions relative to one another. Various arm means may be practiced per the invention.

Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of the ordinary skill in the art, is set forth in the remainder of the specification, which makes reference to the appended figures in which.

Figure 1:
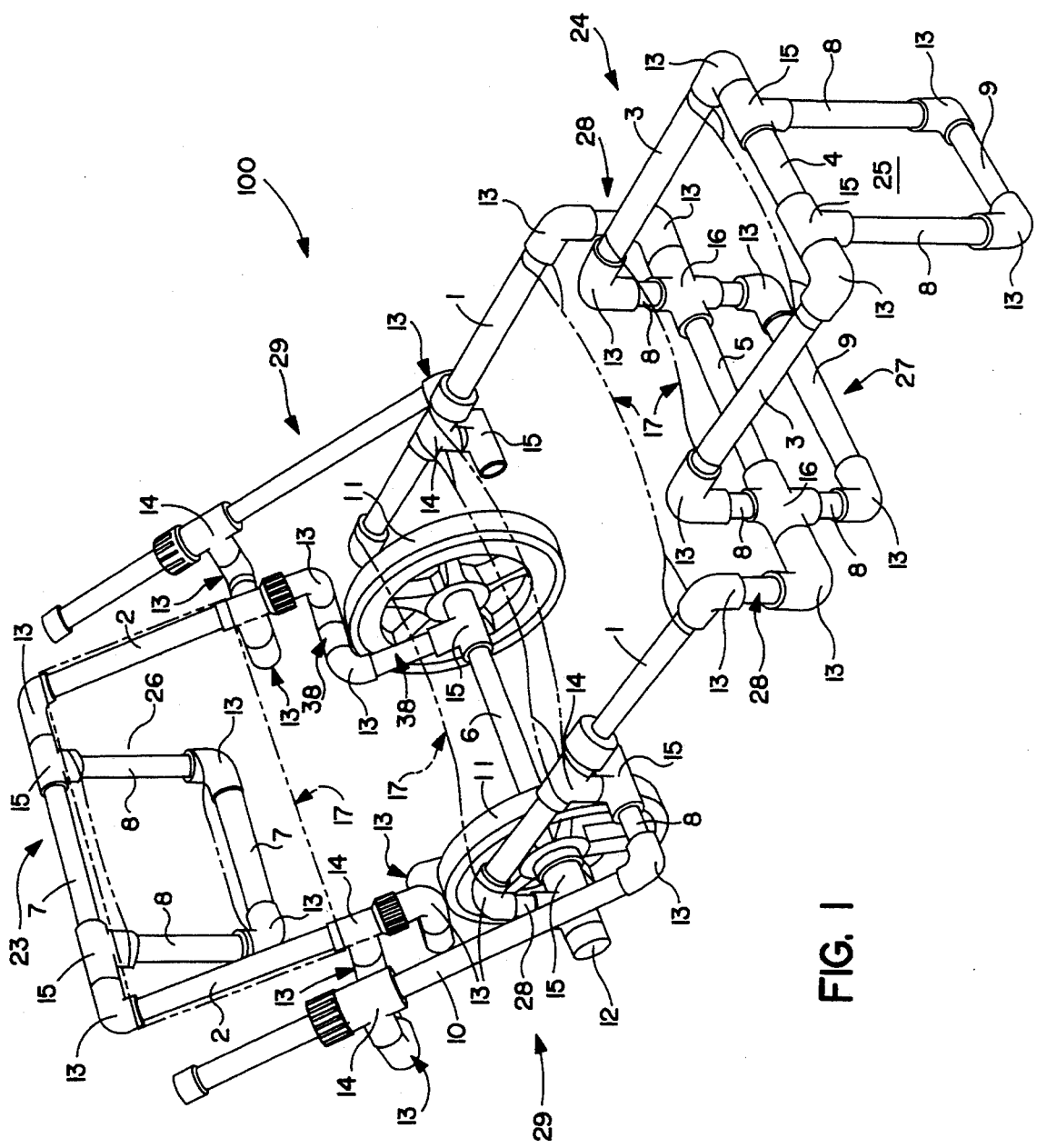
FIG. 1 is a perspective view of one preferred embodiment of the present invention.

Repeat use of reference characters throughout the present specification and appended drawings is intended to represent same or analogous features or elements of the invention.

DETAILED DESCRIPTION OF THE PREFERRED EMBODIMENTS

Reference will now be made in detail to the presently preferred embodiments of the invention, two complete examples of which are fully illustrated in the accompanying drawings. Each example is provided by way of an explanation of the invention, not limitation of the invention. In fact, it will be apparent to those skilled in the art that various modifications and variations can be made in the present invention. For instance, features illustrated or described as part of one embodiment can be used on another embodiment to yield a still further embodiment. Additionally, certain features may be interchanged with similar devices or features not mentioned yet which perform the same or similar function. For example, the hooking devices on the arms of one embodiment might be replaced by a snapping or latching device. Additionally, the single-segmented arms described below in the two fully illustrated preferred embodiments may be replaced by arms comprised of telescopic tubular bars. Thus, it is intended that the present invention cower such modifications and variations as come within the scope of the appended claims and their equivalents.

As discussed in the summary of the invention, the present invention is particularly concerned with the improved construction of outdoor furniture. Typical outdoor furniture must be transported along with other articles to and from recreational activities. Such fact limits the number of articles an individual can carry at one time. A construction of outdoor furniture that converts to a light-duty wagon, eliminates the necessity of carrying the furniture, and increases the carrying capacity of an individual without the necessity of an additional mode of transportation.

Figure 2:
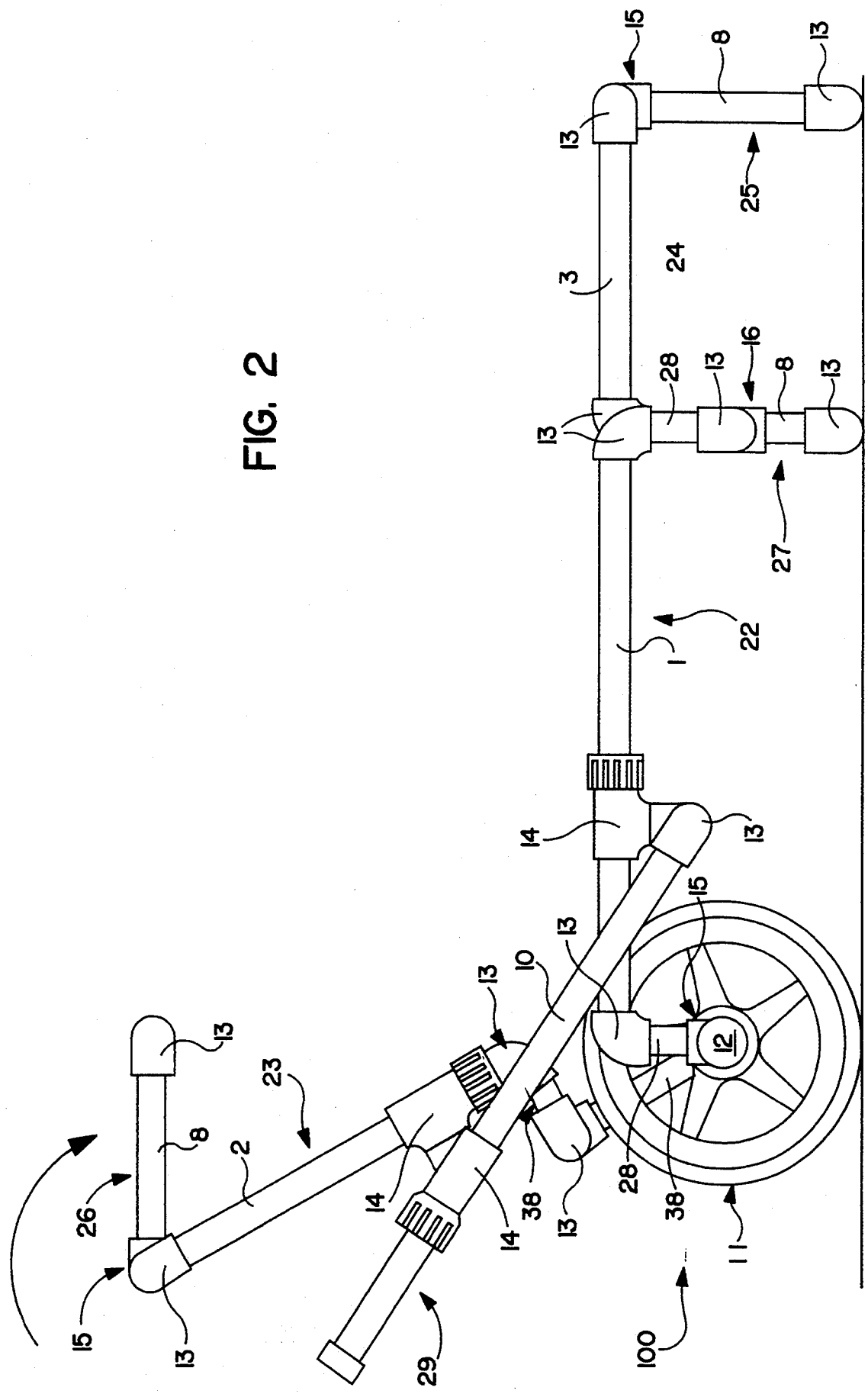
FIG. 2 is a side elevation of the embodiment of the present invention as shown in FIG. 1 in which the upper section is raised to provide a sitting configuration.
Figure 3:
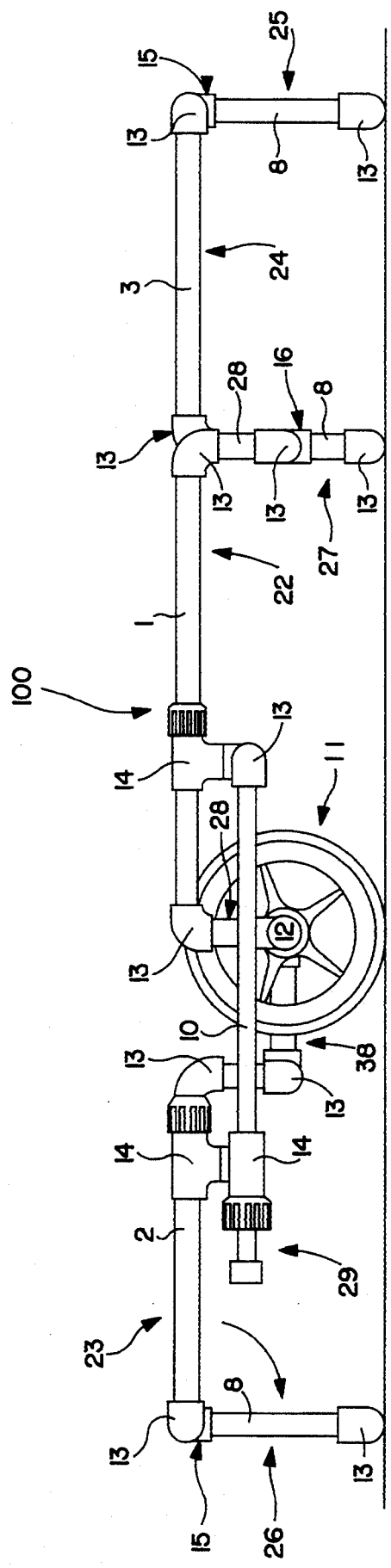
FIG. 3 is a side elevation of the embodiment of the present invention as shown in FIG. 1 in which the upper section is lowered to provide a reclining configuration.

Accordingly, one preferred embodiment of the present invention is outlined generally in FIGS. 1, 2, and 3. Convertible lounge chair and wagon 100 is divided generally into three sections: upper, or back, section 23; center, or seat, section 22; and lower, or leg, section 24. Longitudinal bars 1 comprise the sides of the frame of center section 22. Transverse bar 5 comprises the lower, or foremost, end of the frame of center section 22 and is attached to longitudinal bars 1 in a position below the plane of longitudinal bars 1 by connecting bars 28 and joints 13 and 16. Transverse bar 6 comprises the upper, or uppermost, end of the frame of center section 22 and is attached to longitudinal bars 1 in a position below the plane of longitudinal bars 1 by connecting bars 28 and joints 13 and 15. Transverse bar 6 serves also as an axle supporting wheels 11. Joints 15 and caps 12 secure the position of wheels 11 inside longitudinal bars 1.

Transverse bar 6 is connected to longitudinal bars 2 of the frame of upper section 23 by two segments, each comprised of three connecting bars 38 and three joints 13 such that the first connecting bar 38 of each segment extends radially from transverse bar 6 at either of joints 15. Each of said first connecting bars 38 connects to a second connecting bar 38 at a joint 13 such that each second connecting bar 38 extends outward to a second joint 13 and a third connecting bar 38 (shown particularly in FIG. 2) such that each said third connecting bar 38 is in the plane of its corresponding longitudinal bar 1 and connecting bar 28 of center section 22. Each third connecting bar 38 is connected to a third joint 13 attached in turn to a longitudinal bar 2. Third connecting bar 38 is of such length that when first connecting bar 38 is in a position parallel with longitudinal 1, longitudinal bar 2 is on a line coaxial with its corresponding longitudinal bar 1. Transverse bar 7 comprises the upper end of the frame of upper section 23 and is connected to longitudinal bars 2 by joints 13 and 15.

Upper supporting section 26 is comprised of connecting bars 8 and transverse bar 9 connected by joints 13 and attached to transverse bar 7 by joints 15. Each of connecting bars 8 is of a length such that when first connecting bar 38 is in a position parallel to longitudinal bars 1 and the plane of upper supporting section 26 is perpendicular to the plane of longitudinal bars 1, joints 13 of upper supporting section 26 rest upon a flat surface upon which wheels 11 also rest.

The frame of lower section 24 is comprised of longitudinal bars 3 attached to transverse bar 4 by joints 13 and 15 and to transverse bar 5 of center section 22 by connecting bars 8 and joints 13.

Center supporting section 27 is comprised of connecting bars 8 and transverse bar 9 connected by joints 13 and attached to transverse bar 5 by joints 16.

Lower supporting section 25 is comprised of connecting bars 8 and transverse bar 9 connected by joints 13 and attached to transverse bar 4 by joints 15. Each of connecting bars 8 is of such length that when longitudinal bars 3 are in a horizontal position, joints 13 of lower supporting section 25 rest on the same horizontal plane as joints 13 of center supporting section 27.

Arm means 29 are comprised of various constructions. In this embodiment, they comprise longitudinal bars 10 attached to longitudinal bars 1 of center section 22 and longitudinal bars 2 of upper section 23. Each longitudinal bar 10 is attached at its lower end to a joint 13 that is attached to connecting bar 8 and joint 15. Joint 15 is attached to adjustable fitting 14. Each of adjustable fittings 14 attach to a first joint 13, a connecting bar 8 (not shown), a second joint 13 and a second fitting 14 on longitudinal bars 2 of upper section 23.

Referring now to FIGS. 1-10, all bars, joints, and fittings may be constructed from a plastic material.. In particular, all bars preferably are of a tubular plastic material. Each bar attached to a joint may be held in place by pressure exerted by the joint onto the bar. The bars may turn within the joints about their concentric axes. Bars may, however, pass through adjustable fittings 14, which may be selectively tightened to secure their positions on the bars.

Thus, referring to FIG. 1, lower section 24 pivots about transverse bar 5. Similarly, upper section 23 pivots about transverse bar 6. As the position of upper section 23 is changed, longitudinal bar 10 slides through adjustable fitting 14. Finally, upper supporting section 26 and lower supporting section 25 pivot about transverse bars 7 and 4, respectively.

Again referring to FIG. 1, flexible elements 17 are suspended between each pair of longitudinal bars 1, 2, and 3. Flexible elements 17 are load supporting. Objects placed on elements 17 of center section 22 may be supported also by element 17 of upper section 23 when upper section 23 is in an upright position and when convertible lounge chair and wagon 100 is pulled upward from lower section 24 such that only wheels 11 touch the ground. Arm means 29 provide side support.

Figure 4:
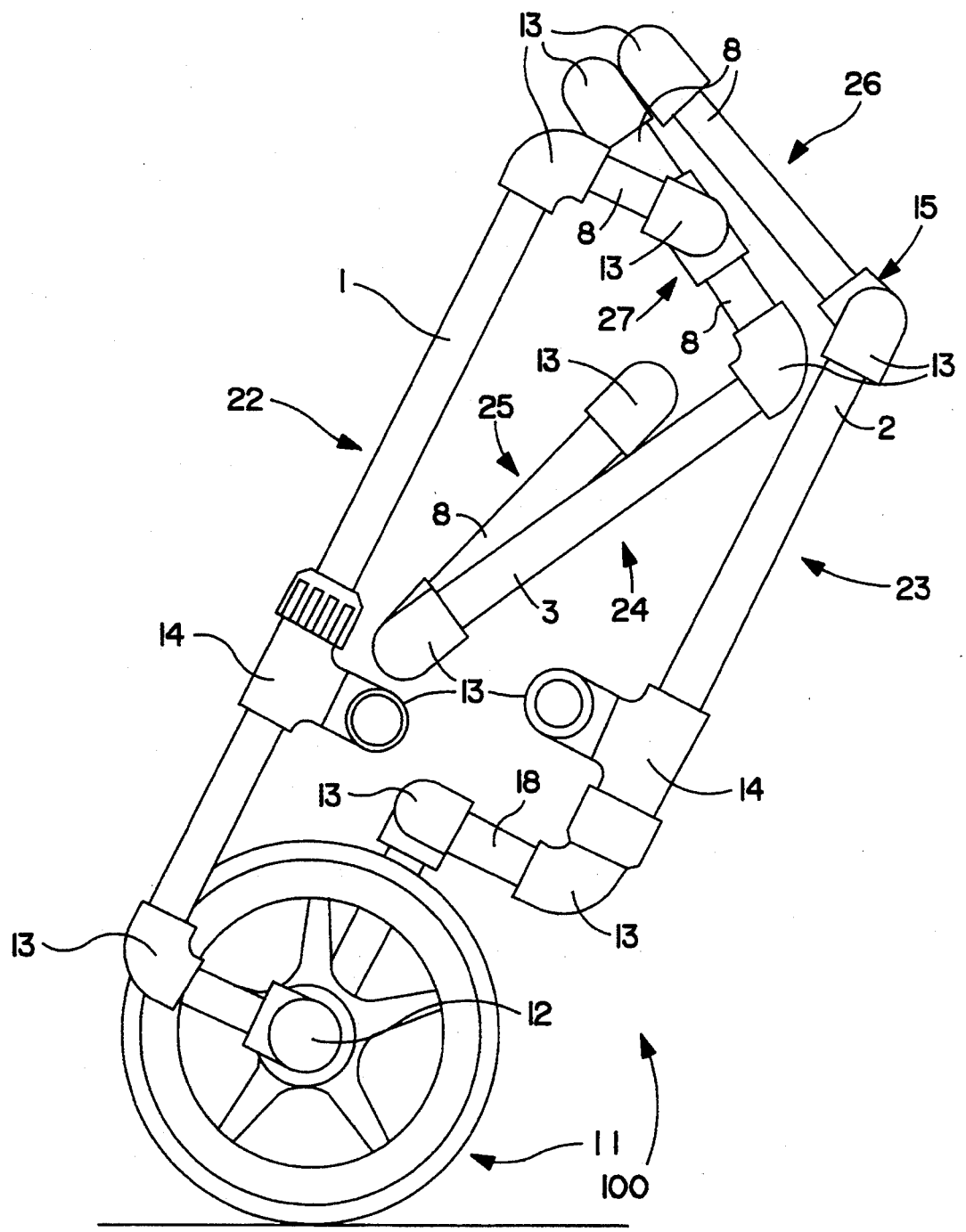
FIG. 4 is a side elevation of an embodiment of the present invention as shown in FIG. 1 in which the upper and lower sections are in a folded, compact position with respect to the center section and in which the arms are removed.

Referring now to FIG. 4, a preferred embodiment as in FIGS. 1, 2, and 3 is depicted in a folded position with arm means 29 removed.

Another preferred embodiment 200 is shown in FIGS. 5, 6, 7, 8, 9, and 10. The construction of lower section 24, lower supporting section 25, center supporting section 27, upper section 23, and upper supporting section 26 are the same as explained in the embodiment 100 described above, as will also be understood by those of ordinary skill in the art from the disclosure of the figures themselves.

Longitudinal bars 1 comprise the sides of the frame of center section 22. Transverse bar 5 comprises the lower end of the frame of center section 22 and is attached to longitudinal bars 1 in a position below the plane of longitudinal bars 1 by a pair of first joints 13, a pair of second joints 13, and a pair of joints 16. Transverse bar 6 comprises the upper end of the frame of center section 22 and is attached to longitudinal bars 1 in a position below the plane of longitudinal bars 1 by a pair of joints 13 and a pair of joints 15. Transverse bar 6 is also an axle supporting wheels 11. Joints 15 and caps 12 secure the position of wheels 11 outside longitudinal bars 1.

Arm means 29 in this embodiment may be comprised of longitudinal bars 18 attached to longitudinal bars 1 of center section 22 and longitudinal bars 2 of upper section 23. At the lower end of each longitudinal bar 18 is attached a loop 20 which may be secured onto either of hooks 21. Different numbers of hooks may be practiced. Each of hooks 21 is secured to a connecting bar 8 by a joint 15 which is in turn secured to one of longitudinal bars 1 of center section 22 by a joint 13 and a joint 15. The upper end of each of longitudinal bars 18 is secured to the upper end of one of longitudinal bars 2 by a bolt and screw combination 19.

Figure 5:
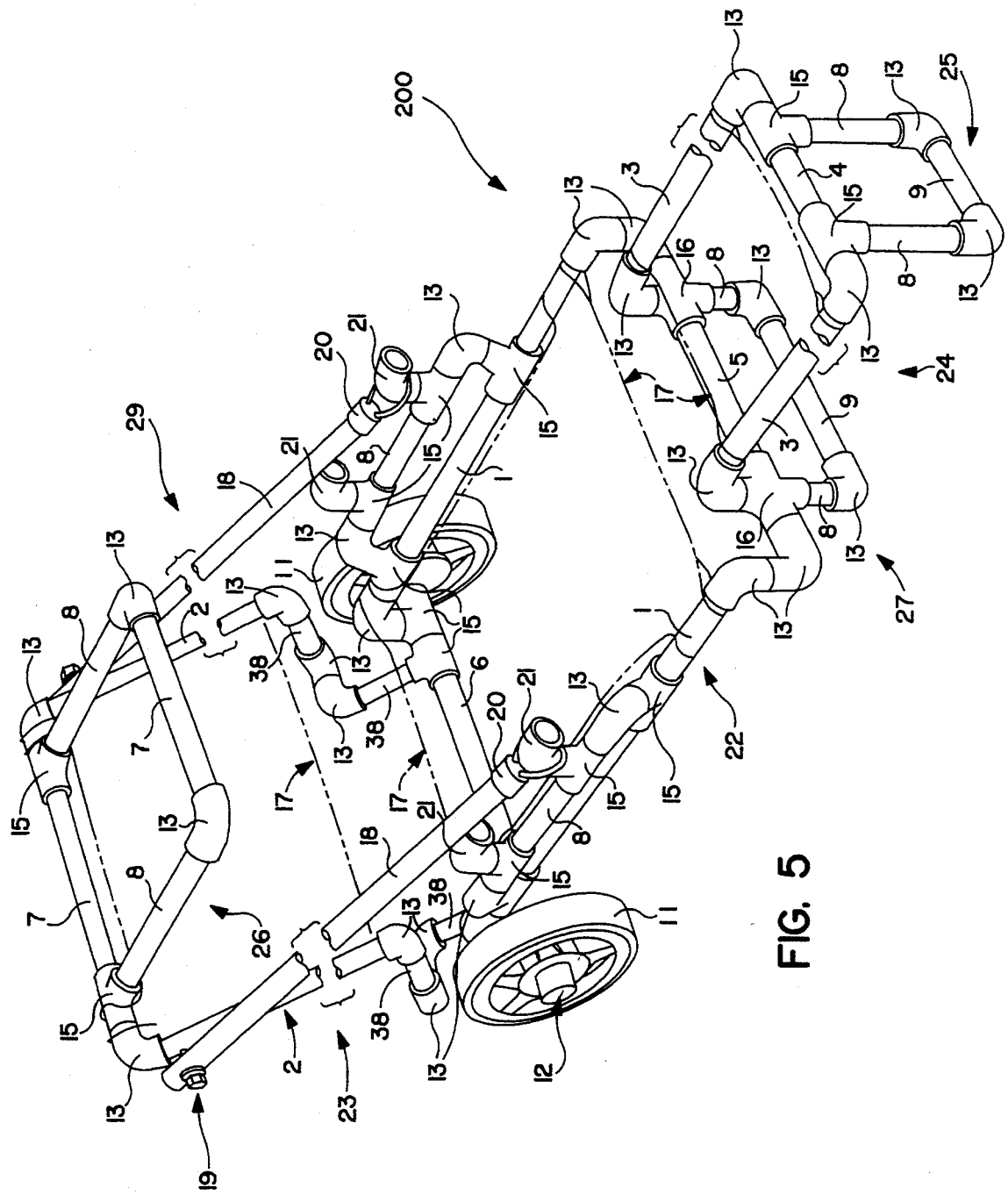
FIG. 5 is a perspective view of another exemplary preferred embodiment of the present invention.
Figure 6:
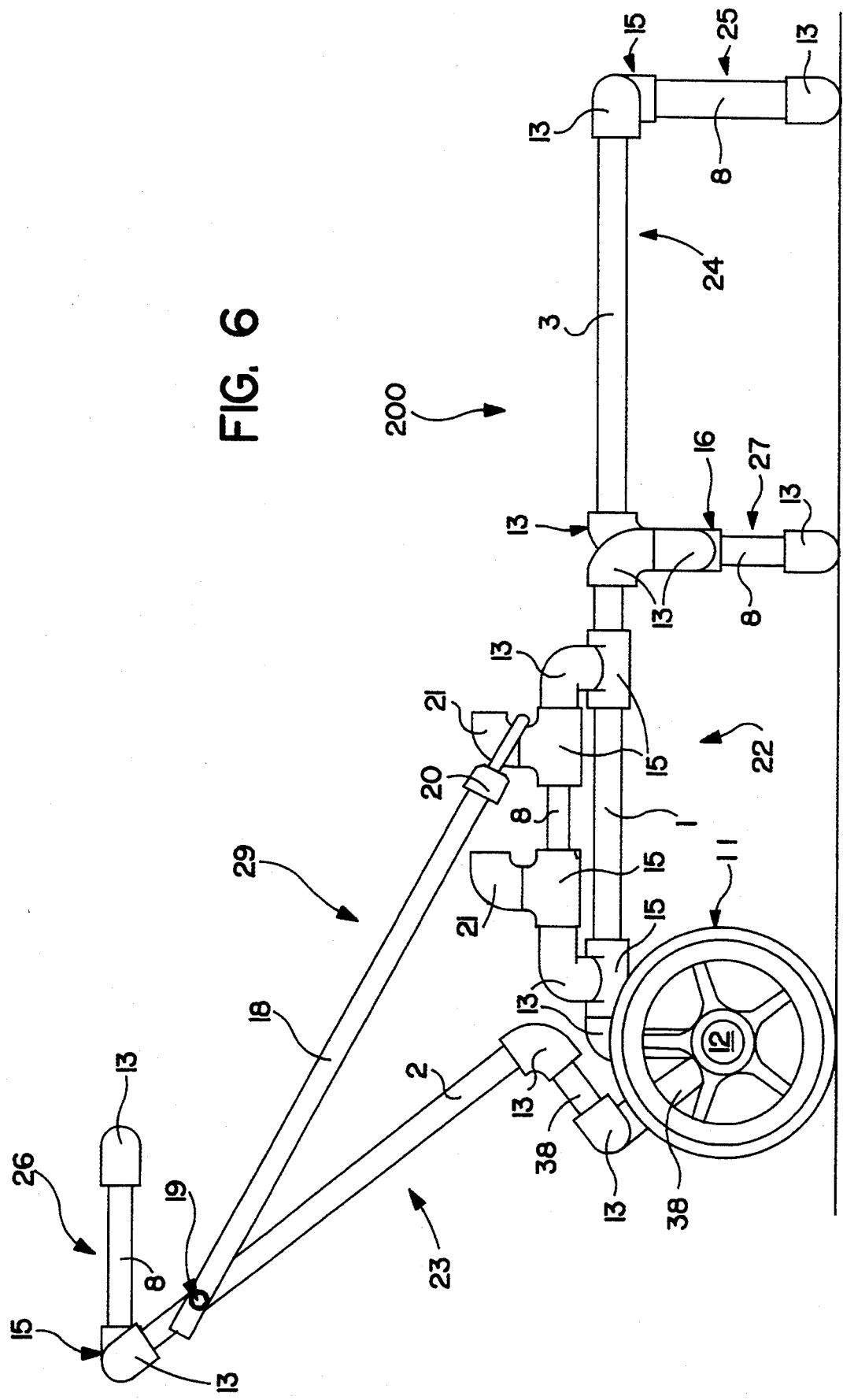
FIGS. 6 and 7 are respective side elevations of the preferred embodiment of the present invention as shown in FIG. 5 in which the upper section is raised to different positions to provide respective alternate sitting configurations.
Figure 7:
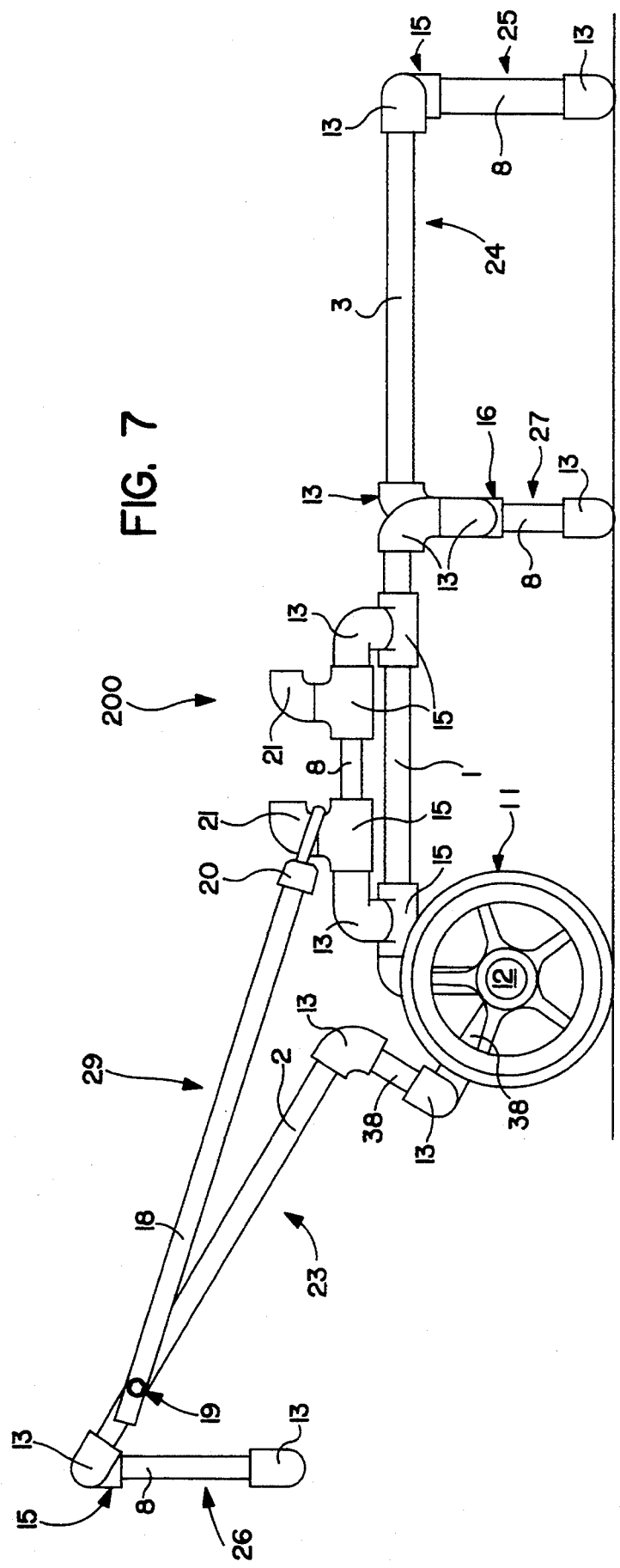

Referring to FIGS. 5, 6, and 7, lower section 24 pivots about transverse bar 5. Similarly, upper section 23 pivots about transverse bar 6. Upper section 23 may be adjusted to different upright positions by switching the attachment of loop 20 from one to another of hooks 21.

Figure 8:
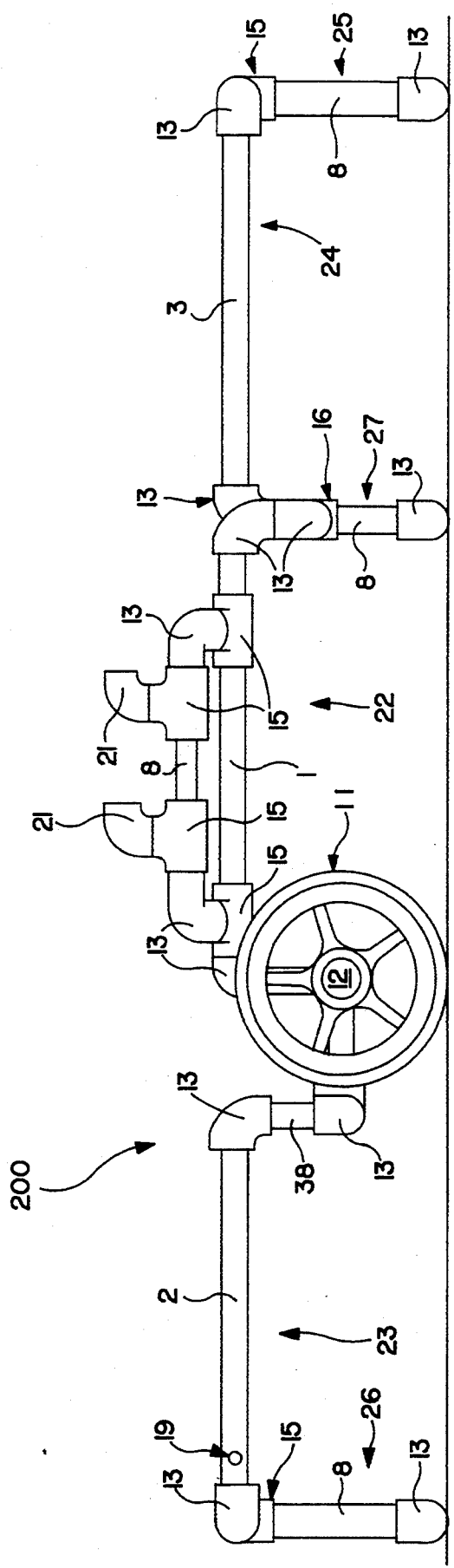
FIG. 8 is a side elevation of the embodiment of the present invention as shown in FIG. 5 in which the upper section is lowered to provide a reclining configuration.

Referring to FIG. 8, this preferred embodiment is shown in a reclined position with longitudinal bars 18 of arm means 29 removed.

Figure 9:
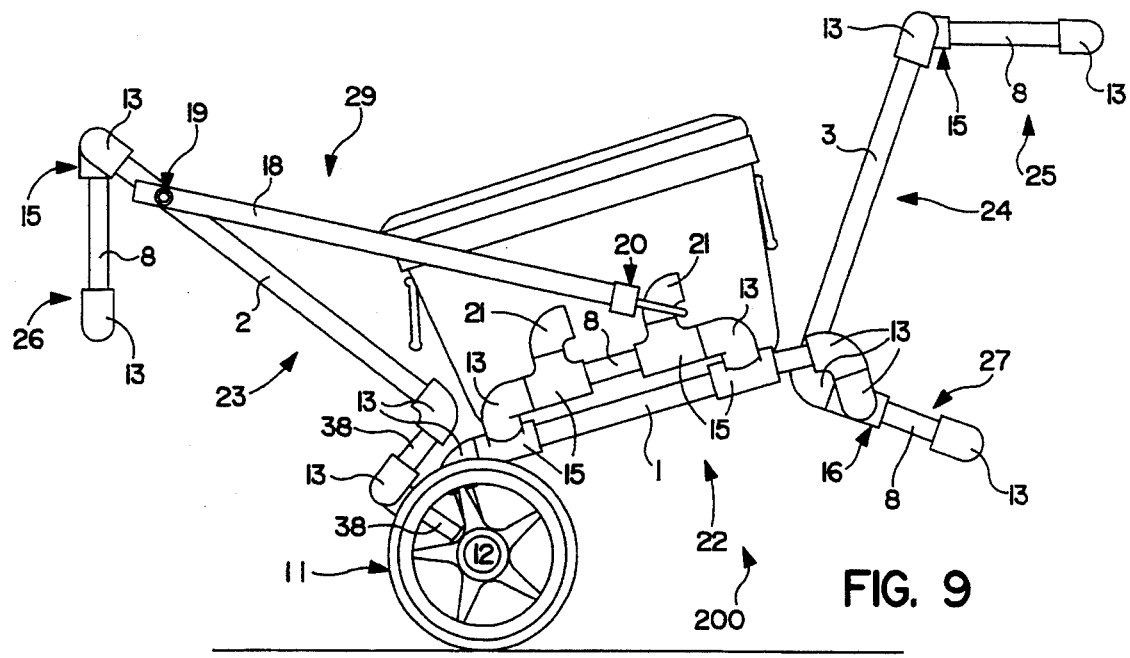
FIG. 9 is a side elevation of the embodiment of the present invention as shown in FIG. 5 in which the lower section is raised, thereby allowing use of the present invention as a light-duty wagon.

Referring again to FIG. 5, flexible elements 17 are suspended between each pair of longitudinal bars 1, 2, and 3. Flexible elements 17 are load supporting. Referring now to FIG. 9, objects placed on elements 17 of center section 22 may be supported also by element 17 of upper section 23 when upper section 23 is in an upright position and when convertible lounge chair and wagon 200 is pulled upward from lower section 24 such that only wheels 11 touch the ground. Arm means 29 provide side support.

Figure 10:
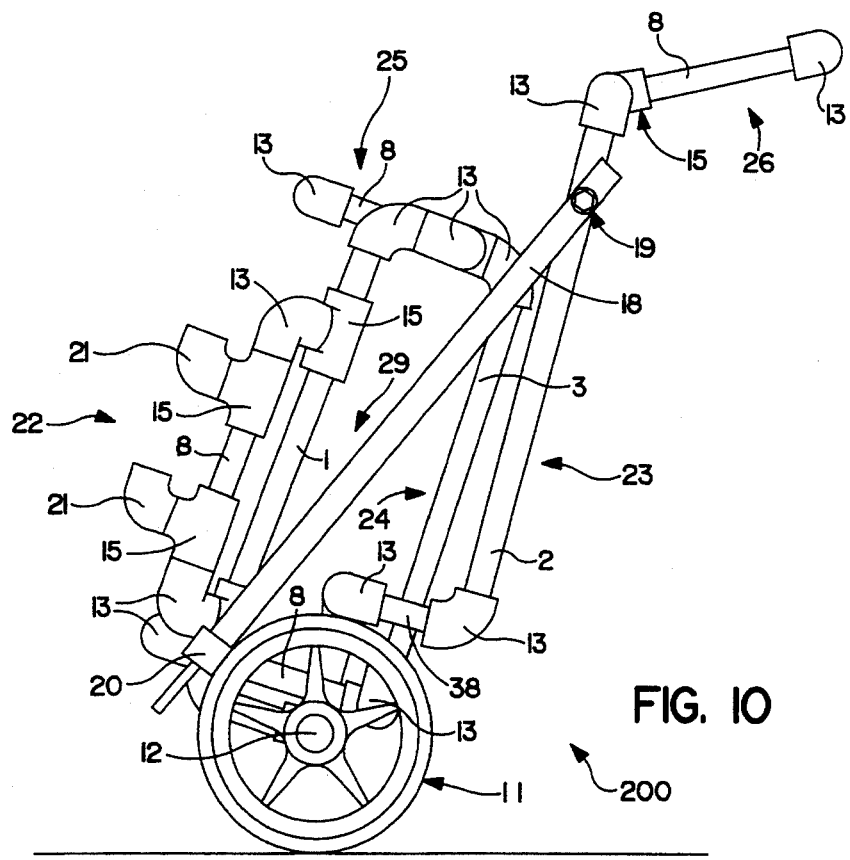
FIG. 10 is a side elevation of an embodiment of the present invention as shown in FIG. 5 in which the upper and lower sections are in a folded, compact position with respect to the center section.

Referring now to FIG. 10, a preferred embodiment as in FIGS. 5, 6, 7, 8, and 9 is depicted in a folded position.

Throughout FIGS. 1-10, joints are depicted as connected to each other without intervening connecting bars. It is understood by those of ordinary skill in the art that such joints are connected by such bars but that said bars are not visible and are thus not referred to explicitly in the above detailed description.

While particular embodiments of the invention have been described and shown, it will be understood by those of ordinary skill in the art that the present invention is not limited thereto since many modifications may be made. In particular, the construction as described above employs tubular plastic bars and similarly constructed joints and fittings. Such construction materials are readily accessible and are well adapted to outdoor weather conditions. It is understood that other materials may be employed, for example tubular metal bars and metal joints and fittings. Additionally, equivalent devices may be employed for attaching arm means 29 to center and upper sections 22 and 23. Therefore, it is contemplated by the present application to cover any and all such embodiments that may fall within the scope of the invention and the appended claims.

What is claimed is:

1. A convertible folding lounge chair and combination wagon, comprising:

three rectangular sections comprising respective leg, seat, and back sections, said back and leg sections being pivotally joined to said seat section at opposite ends of said seat section;

a pair of arms connecting said upper and center sections, wherein said pair of arms are comprised of two respective bars, each pivotably mounted at its foremost end to one of opposed side elements of said seat section, with the rearmost end of each of said arms connected by a fitting pivotably mounted to a corresponding side element of said back section, with each said arm passing through its respective fitting, allowing movement of said back section to various positions with respect to said seat section, said fittings selectively securing said arms for correspondingly securing the selected position of said back section;

load-bearing wheels attached at the pivotal juncture between said back and center sections;

load-bearing means, attached at the pivotal juncture between said seat and said leg sections, for selectively folding up and under said seat section; and flexible support elements connected to and between side elements of said back, seat, and leg sections, for supporting a user thereon.

2. A convertible folding lounge chair and combination wagon as in claim 1, wherein said pair of arms are detachably pivotably mounted to said side elements of said seat section, and detachably connected to said side elements of said back section, such that said pair of arms are removable therefrom.

3. A convertible folding lounge chair and combination wagon as in claim 2, wherein said rectangular pivotally joined sections are comprised of respective frames having parallel longitudinal bars and supporting transverse bars.

4. A convertible folding lounge chair and combination wagon as in claim 1, wherein said frames are comprised of tubular plastic material.

5. A convertible folding lounge chair and combination wagon as in claim 1, wherein said rectangular pivotally joined sections are comprised of respective frames having parallel longitudinal bars and supporting transverse bars.

6. A convertible folding lounge chair and combination wagon as in claim 1, wherein said frames are comprised of tubular plastic material.

7. A convertible folding lounge chair and combination wagon as in claim 1, further including folding load-bearing members pivotally attached to a rearmost end of said back section and to a foremost end of said leg section.

8. A convertible folding lounge chair and combination wagon as in claim 1, further wherein said three rectangular sections are joined such that said leg section is foldable upwardly on or down beneath said seat section.

9. A convertible folding lounge chair and combination wagon as in claim 8, further including folding load-bearing members pivotally attached to the rearmost end of said back section and to the foremost end of said leg section.

10. A convertible folding lounge chair and combination wagon as in claim 9, wherein said rectangular pivotally joined sections are comprised of respective frames having parallel longitudinal bars and supporting transverse bars.

11. A convertible folding lounge chair and combination wagon as in claim 9, wherein said frames are comprised of tubular plastic material.

12. A convertible folding lounge chair and combination wagon as claim 8, wherein said rectangular pivotally joined sections are comprised of respective frames having parallel longitudinal bars and supporting transverse bars.

13. A convertible folding lounge chair and combination wagon as in claim 12, wherein said frames are comprised of tubular plastic material.

14. A convertible folding lounge chair and combination wagon as in claim 13, further including folding load-bearing members pivotally attached to the rearmost end of said back section and to the foremost end of said leg section.

15. A convertible folding lounge chair and combination wagon as in claim 1, wherein said rectangular pivotally joined sections are comprised of respective frames having parallel longitudinal bars and supporting transverse bars.

16. A convertible folding lounge chair and combination wagon as in claim 15, wherein said frames are comprised of tubular plastic material.

17. Frame for convertible folding lounge chair and wagon comprising:

a rectangular seat section comprising two seat section longitudinal bars fitted at each end thereof to seat section transverse bars below the plane of said seat section longitudinal bars, a rearmost of said seat section transverse bars forming an axle for wheels supporting a rear end of said seat section;

a rectangular back section comprising two back section longitudinal bars fitted at their rearmost ends to a back section transverse bar and fitted at their foremost ends to a joint extending below the plane of, and between, said back section longitudinal bars, said joint further being connected to said rearmost seat section transverse bar so that said back section is pivotable about said rearmost seat section transverse bar;

a first supporting section pivotably connected to said back section transverse bar;

a rectangular leg section comprising two leg section longitudinal bars fitted at their foremost ends to a leg section transverse bar and at their rearmost ends to a foremost said seat section transverse bar such that the plane of said leg section longitudinal bars is above, and said leg section pivots around, such foremost transverse bar of said seat section;

a second supporting section pivotably connected to said foremost transverse bar of said seat section;

a third supporting section pivotably connected to said transverse bar of said leg section; and arm means for selectively interconnecting said seat and back sections in predetermined positions relative to one another.

18. A frame as in claim 17, wherein said arm means comprise detachable arms, comprising two respective bars, each pivotably mounted at its foremost end to one of said longitudinal bars of said seat section, each of said detachable arms further being connected by a fitting pivotably mounted to said longitudinal bars of said back section, with each said detachable arm passing through its respective fitting, allowing movement of said back section to various positions with respect to said seat section, said fittings selectively securing said arms for correspondingly securing the selected position of said back section.

19. A frame as in claim 18, further including flexible elements connected to and suspended between said longitudinal bars of said back, seat, and leg sections, for supporting a user thereon.

20. A frame as in claim 19, further including wheels mounted on said axle and positioned between said longitudinal bars of said seat section.

21. A frame as in claim 20, wherein said first, second, and third supporting sections are comprised of three bars fitted together in a U-shaped configuration.

22. A frame as in claim 20, wherein all of said bars are comprised of tubular plastic material.

* * * * *